(12) United States Patent
Brown et al.

(10) Patent No.: US 10,814,582 B2
(45) Date of Patent: Oct. 27, 2020

(54) FLEXIBLE VENEER PANEL WITH METAL MESH LAYER

(71) Applicant: Goodrich Corporation, Charlotte, NC (US)

(72) Inventors: Greer Brown, New Albany, IN (US); Christopher L. Chapman, Lanesville, IN (US)

(73) Assignee: GOODRICH CORPORATION, Charlotte, NC (US)

( * ) Notice: Subject to any disclaimer, the term of this patent is extended or adjusted under 35 U.S.C. 154(b) by 625 days.

(21) Appl. No.: 14/694,663

(22) Filed: Apr. 23, 2015

(65) Prior Publication Data

US 2016/0311194 A1    Oct. 27, 2016

(51) Int. Cl.
*B32B 5/02*       (2006.01)
*B32B 7/12*       (2006.01)
(Continued)

(52) U.S. Cl.
CPC ............... *B32B 5/028* (2013.01); *B32B 7/12* (2013.01); *B32B 15/00* (2013.01); *B32B 15/02* (2013.01);
(Continued)

(58) Field of Classification Search
CPC ........... B32B 5/028; B32B 7/12; B32B 15/00; B32B 15/02; B32B 15/10; B32B 15/20; B32B 21/04; B32B 21/14; B32B 2260/026; B32B 2260/226; B32B 2260/046; B32B 2451/00; B32B 15/04; B32B 15/08–10; B32B 15/18–20; B32B 21/00–14; B32B 37/12–1292; B32B 2262/103; B32B 2311/24–30; B32B 2607/00–02; B32B 2250/40; B32B 3/12; B32B 3/266;
(Continued)

(56) References Cited

U.S. PATENT DOCUMENTS

| | | |
|---|---|---|
| 488,809 A | 12/1892 | Heepe |
| 1,387,011 A | 8/1921 | Ratcliff |

(Continued)

FOREIGN PATENT DOCUMENTS

| | | |
|---|---|---|
| CN | 101811313 | 8/2010 |
| CN | 101811313 A * | 8/2010 |

(Continued)

OTHER PUBLICATIONS

"CN101811313_Machine Translation" is a machine translation of CN 101811313.*

(Continued)

*Primary Examiner* — Laura C Powers
*Assistant Examiner* — Larissa Rowe Emrich
(74) *Attorney, Agent, or Firm* — Snell & Wilmer L.L.P.

(57) ABSTRACT

A veneer panel is provided. The panel may comprise a face veneer, a metal mesh proximate the veneer, a backing layer proximate the metal mesh, and a thermoset adhesive bonding the wood veneer to the metal mesh and the backing layer. A method of making a veneer panel is also provided. The method may comprise the steps of forming a veneer assembly by stacking a face veneer, a metal mesh, and a backing layer, applying an adhesive material between a back surface of the face veneer and the metal mesh, and pressing the veneer assembly.

20 Claims, 3 Drawing Sheets

(51) Int. Cl.

| | |
|---|---|
| *B32B 15/18* | (2006.01) |
| *B32B 15/02* | (2006.01) |
| *B32B 15/00* | (2006.01) |
| *B32B 21/14* | (2006.01) |
| *B32B 15/20* | (2006.01) |
| *B32B 15/10* | (2006.01) |
| *B32B 21/04* | (2006.01) |
| *B32B 37/06* | (2006.01) |
| *B32B 37/10* | (2006.01) |
| *B32B 37/12* | (2006.01) |
| *B32B 15/14* | (2006.01) |
| *B32B 15/12* | (2006.01) |

(52) U.S. Cl.
CPC .............. *B32B 15/10* (2013.01); *B32B 15/12* (2013.01); *B32B 15/14* (2013.01); *B32B 15/18* (2013.01); *B32B 15/20* (2013.01); *B32B 21/04* (2013.01); *B32B 21/14* (2013.01); *B32B 37/06* (2013.01); *B32B 37/10* (2013.01); *B32B 37/12* (2013.01); *B32B 2260/021* (2013.01); *B32B 2260/023* (2013.01); *B32B 2260/026* (2013.01); *B32B 2260/046* (2013.01); *B32B 2262/08* (2013.01); *B32B 2262/103* (2013.01); *B32B 2307/50* (2013.01); *B32B 2307/732* (2013.01); *B32B 2451/00* (2013.01)

(58) Field of Classification Search
CPC ............ B32B 2250/03; B32B 2305/08; B32B 2305/38; B32B 2317/16; B32B 2419/04; Y10T 428/24058–24066; Y10T 428/24132; Y10T 428/24438–24471; Y10T 428/249925; Y10T 428/662; Y10T 442/109; Y10T 442/126; Y10T 442/131; Y10T 442/145; Y10T 442/164; B44C 5/0415; B27D 1/00
USPC ..... 428/105–106, 114, 151–155, 292.4, 541; 442/6, 16, 19, 20, 23, 27, 38; 52/384–392; 249/15
See application file for complete search history.

(56) References Cited

U.S. PATENT DOCUMENTS

| | | | | |
|---|---|---|---|---|
| 4,968,771 A | * | 11/1990 | Baxter | .................... C08L 97/02 524/376 |
| 5,225,264 A | * | 7/1993 | Kato | .................... A47B 96/206 428/137 |
| 5,243,126 A | | 9/1993 | Chow et al. | |
| 6,033,754 A | * | 3/2000 | Cooke | ..................... B27D 1/04 428/106 |
| 8,083,878 B1 | * | 12/2011 | Booth | ....................... B32B 7/12 156/153 |
| 2008/0152862 A1 | * | 6/2008 | Idestrup | .................... B32B 5/12 428/106 |
| 2010/0310893 A1 | * | 12/2010 | Derbyshire | ............. B32B 21/02 428/528 |
| 2015/0367609 A1 | * | 12/2015 | Aeschlimann | ........... B27D 1/04 428/106 |

FOREIGN PATENT DOCUMENTS

| | | | | | |
|---|---|---|---|---|---|
| GB | | 2161424 A | * | 1/1986 | ............. B32B 21/13 |
| GB | | 2306389 A | * | 5/1997 | ............. B32B 15/10 |
| WO | WO-2006106232 A2 | * | 10/2006 | ............... B27D 1/00 |
| WO | | 2008057390 | | 5/2008 | |
| ZA | | 9606990 | | 2/1997 | |

OTHER PUBLICATIONS

"400 Mesh T304 Stainless .0010 48' Wide." 400 Mesh Plain Weave Stainless Steel Type 304 48 Inches Wide Screen, TWP, Sep. 24, 2014, www.twpinc.com/400-mesh-woven-stainless-0010.*
"WO2006106232_Machine Translation" is a machine translation of WO 2006106232. (Year: 2006).*
Wade, Leroy G. "Phenol." Encyclopædia Britannica. Encyclopædia Britannica, Inc., Nov. 23, 2018. Web. <https://www.britannica.com/science/phenol>. (Year: 2018).*
"Plywood With an Iron Skeleton." Popular Mechanics, Mar. 1954, p. 100. (Year: 1954).*
Hu, Yingchen, et al. "Design and Property Analysis of the Metal Mesh Reinforced LVL." Advanced Materials Research, vol. 113-116, Jun. 7, 2010, pp. 2145-2149., doi:10.4028/www.scientific.net/amr.113-116.2145. (Year: 2010).*
Extended European Search Report dated Aug. 25, 2016 in European Application No. 16166155.8.
Database WPI, week 201066, Thomson Scientific, London, GB, 1 pages, Aug. 25, 2010.
European Patent Office, European Office Action dated Apr. 29, 2019 in Application No. 16166155.8.

* cited by examiner

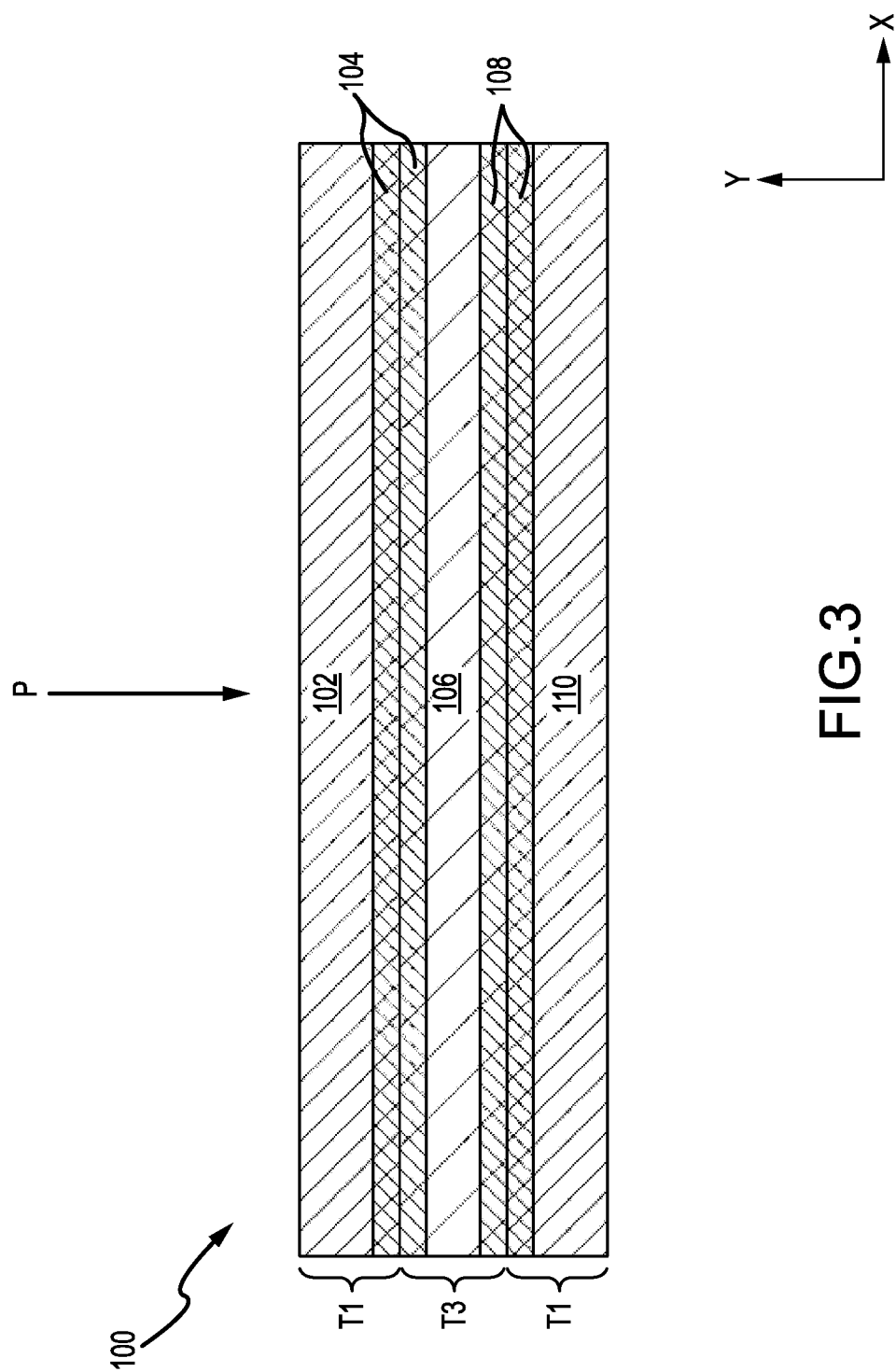

FLEXIBLE VENEER PANEL WITH METAL MESH LAYER

FIELD OF INVENTION

The present disclosure relates to decorative and structural panels, and, more specifically, to a flexible veneer panel with a metal mesh layer.

BACKGROUND

Current veneer panels may include paper-backed veneer panels, fleece-backed veneer panels, and two-ply veneer panels. In some instances, paper-backed veneer panels and fleece-backed veneer panels may tear or wrinkle. Each of the existing panels may also experience delamination in some applications. In other instances, these flexible panels may not be useable in vehicular applications due to limitations such as flammability of the panels. The two-ply veneer panel may provide flexibility but is also susceptible to being cracked and/or broken.

SUMMARY

A panel may comprise a wood veneer, a metal mesh proximate the veneer, a backing layer proximate the metal mesh, and a thermoset adhesive bonding the wood veneer to the metal mesh and the backing layer.

In various embodiments, the adhesive material may comprise at least one of a phenolic glue film or a phenolic surface film. The wood veneer may comprise a thickness from 0.015 inches to 0.030 inches. The thermoset adhesive may have penetrated into the wood veneer and the metal mesh. The metal mesh may comprise at least one of stainless steel or aluminum. The metal mesh may metal wires with a diameter from 0.0009 inches to 0.0019 inches. The metal mesh may comprise a 400 wire-per-inch wire mesh. The backing layer may comprise a second wood veneer.

A method of making a veneer panel may comprise the steps of forming a veneer assembly by stacking a face veneer, a metal mesh, and a backing layer, applying an adhesive material between a back surface of the face veneer and the metal mesh, and pressing the veneer assembly.

In various embodiments, the adhesive material may comprise at least one of a phenolic glue film or a phenolic surface film. The pressing the veneer assembly may further comprise heating the veneer assembly. The veneer panel may be flexed using a flex machine. The metal mesh may comprise at least one of stainless steel or aluminum. The metal mesh may also comprise metal wires with a diameter from 0.0009 inches to 0.0019 inches. The metal mesh may further comprise a 400 wire-per-inch mesh.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

FIG. 3 illustrates a cross-sectional view of a 3-ply veneer with adhesive material propagated into the metal material, in accordance with various embodiments.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

A 3-ply wood veneer panel may comprise a metal mesh and/or metal fabric layer disposed between two wooden layers. Adhesive material may bond the three layers together with each layer having a thickness substantially less than the thickness of the other 2 dimensions. The resulting 3-ply panel may display flexibility relative to the plane formed by the two larger dimensions.

Figure 1:
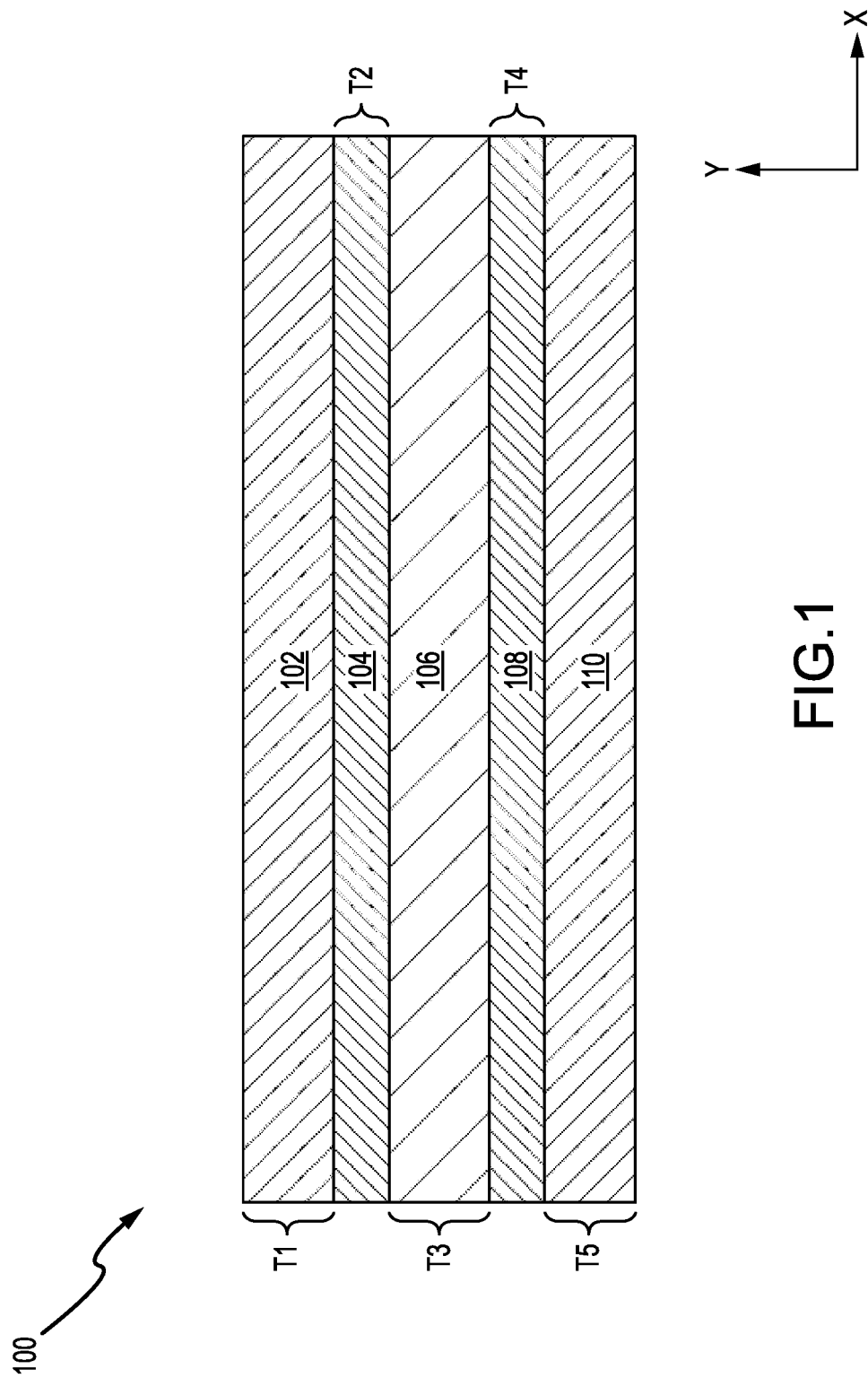
FIGS. 1 illustrates a cross-sectional view of a 3-ply veneer panel with an adhesive material disposed between the plies, in accordance with various embodiments.

With reference to FIG. 1, a veneer panel 100 is shown, in accordance with various embodiments. Veneer panel 100 may be a veneer assembly with three or more layers stacked in the y-direction relative to the axes provided for reference. Veneer panel 100 may have a face veneer 102 that may comprise a thin layer of walnut, cherry, birch, rosewood, oak, maple, mahogany, hemlock, teak, walnut, or any other wood species. Face veneer 102 of veneer panel 100 may have a thickness T1 ranging from 0.015 inches to 0.030 inches (0.38 mm to 0.76 mm) For example, face veneer 102 may comprise a thickness T1 of 0.02 inches (0.508 mm) Face veneer 102 may further be sanded to provide a smooth, decorative surface for finishing. Veneer panel may be a flexible veneer panel. Veneer panel 100 may be formed in any dimensions, and readily be made into rectangular 4 foot by 8 foot (1.2 m to 2.4 m) panels. Veneer panels may also be cut into smaller sizes or varied shapes.

In various embodiments, an adhesive material 104 may be applied to a back surface of face veneer 102. The adhesive material may be in the form of a thermoset adhesive, such as a phenolic glue film or a phenolic surface film, or any other suitable adhesive. Adhesive material 104 may have a thickness T2 of 0.005 inches (0.13 mm), for example. A phenolic glue film may allow the glue to be cut in a sheet form and disposed between a back surface face veneer 102 and metal mesh 106 during the layup process.

In various embodiments, a metal mesh 106 may act as a core material for veneer panel 100. Metal mesh 106 may be a woven metal material similar to a fabric. Metal mesh 106 may be woven on high-speed looms in various weaves (e.g., twill weave or square weave). The diameter of the wire in a metal mesh contributes more to the strength of a veneer panel than the type of weave of the mesh being. The metal mesh may range from 325 wire-per-inch mesh to 500 wire-per-inch (325 wire-per-2.54-cm to 500 wire-per-2.54-cm) mesh. For example, the metal mesh may be a 400 wire-per-inch (400 wire-per-2.54-cm) mesh or other fabric-like metal woven mesh.

In various embodiments, metal mesh 106 may be woven from metal wires, the metal wires having a diameter from 0.0009 inches (0.023 mm) to 0.0019 inches (0.048 mm) For example, a veneer panel may be made from a metal weave of wires with 0.0012 inch (0.0305 mm) diameter. Higher diameter wires may show through thin cuts of face veneer 102 or otherwise telegraph the presence of the woven wires behind face veneer 102. Metal mesh 106 may thus have a thickness T3 less than 0.05 inches (1.27 mm).

In various embodiments, metal mesh 106 may be made from any metallic material (e.g., aluminum, steel, or any other suitable metal). A corrosion resistant stainless steel such as T-316 stainless steel (16-18% chromium, 10-14% nickel, 0.8% max carbon, 2% max magnesium, 0.75% max silicon, 2-3% molybdenum) or T-304 stainless steel (18-20% chromium, 8-10.5% nickel, 0.8% max carbon, 2% max magnesium, 0.75% max silicon) may be suitable for its corrosion resistance. In that regard, the material for metal mesh 106 may be selected to resist reacting chemicals such as tannins in the wood and/or fire retardant surface treatments, depending on the desired application. Aluminum mesh may also be used and is of relatively light weight with generally low melting point. Thus, aluminum may be less fire resistant than steel but provides weight savings compared to steel. In that regard, various metals may be compared and selected for metal mesh 106 based on suitability to the final application of veneer panel 100.

In various embodiments, an adhesive material 108 may be applied to a surface of metal mesh 106 on the opposite side of metal mesh 106 from adhesive material 104. Thus, metal mesh 106 may be sandwiched between adhesive material 104 and adhesive material 108. Adhesive material 108 may be in the form of a thermoset adhesive (e.g., a phenolic glue film or a phenolic surface film). Adhesive material 108 may have a thickness T4 of 0.005 inches (0.13 mm), for example. A phenolic glue film may allow the glue to be cut in a sheet form and located between backing layer 110 and metal mesh 106 during the layup process.

In various embodiments, backing layer 110 may form the back surface of veneer panel 100. Backing layer 110 may thus be hidden from sight in applications where only one side of veneer panel 100 is visible. Thus, backing layer 110 may be made from a less visually appealing and or mismatched material. Backing layer 110 may be a thin layer of walnut, cherry, birch, rosewood, oak, maple, mahogany, hemlock, teak, walnut, poplar, or any other wood species. Using a wood material for backing layer 110, and particularly the same wood species as face veneer 102, may result in a more balanced coefficient of thermal expansion than other backing materials. Backing layer 110 may be a wooden layer with a thickness T5 ranging from 0.015 inches to 0.030 inches (0.38 mm to 0.76 mm) For example, backing layer 110 may comprise a poplar layer with thickness T5 of 0.02 inches (0.508 mm).

In various embodiments, the grain of the wood on backing layer 110 may be aligned with the grain of face veneer 102 for flexibility, or the grain of the wood on backing layer 110 may be disposed roughly orthogonal to the grain of face veneer 102 for increased stiffness. Backing layer 110 may further be sanded to provide a smooth surface with a consistent thickness. In various embodiments, backing layer 110 may be made from non-wood materials such as fiber-reinforced composite, paper, felt, or another suitable material.

Figure 2:
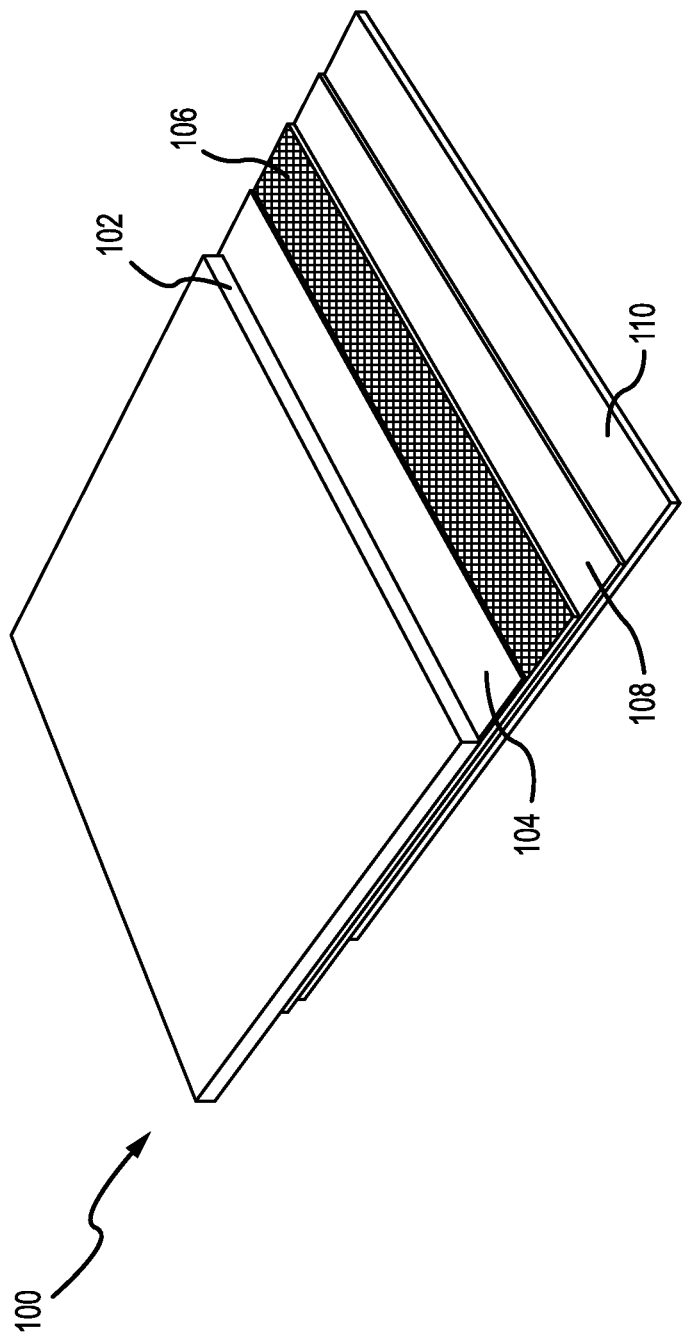
FIG. 2 illustrates a perspective view of a 3-ply veneer panel with the layers used to make the panel spread staggered for clarity, in accordance with various embodiments.

With reference to FIG. 2, veneer panel 100 is shown in a 3-ply configuration with each layer fanned out for visibility. The layup for veneer panel 100 comprises face veneer 102 on a top surface. Adhesive material 104 may be a continuous sheet cut into a shape to mirror the shape of face veneer 102 and the other layers of veneer panel 100. Metal mesh 106 may be disposed between adhesive material 104 and adhesive material 108. A backing layer 110 may be disposed adjacent adhesive material 108 to form the bottom surface of veneer panel 100. In that regard, backing layer 110 may provide support for veneer panel 100. Face veneer 102, adhesive material 104, metal mesh 106, adhesive material 108, and backing layer 110 may each be a separate layer cut into the same shape and be aligned prior to a heat pressing treatment to form the veneer panel 100.

With reference to FIG. 3, a veneer panel 100 is shown with a heat and/or pressure treatment (e.g., by pressing veneer panel 100 inside a press machine), in accordance with various embodiments. Pressure P may be a compressive force applied uniformly and/or substantially uniformly across the outer surfaces of veneer panel 100 through face veneer 102 and backing layer 110. Veneer panel 100 may also be heated to reach the thermal threshold to set thermosetting adhesive materials.

In various embodiments, and in response to the increased temperature and pressure, adhesive material 104 may penetrate (in the y-direction) into fibers of the wood used for face veneer 102 as well as into metal mesh 106. Metal mesh 106 and face veneer 102 may press together and contact one another or have a thin layer of adhesive remaining between one another. Similarly, in response to the increased temperature and pressure, adhesive material 108 may penetrate into the material (e.g., wood) used for backing layer 110 as well as into metal mesh 106. Metal mesh 106 and backing layer 110 may press together and contact one another or have a thin layer of adhesive remaining between one another. Adhesive material 104 and adhesive material 108 may then thermoset and initiate cross-linking bonds. Adhesive material that has invaded into face veneer 102, metal mesh 106, and backing layer 110 may provide a strong adhesion and resist delamination.

In various embodiments, veneer panel 100 may be sanded after going through the press process to create more uniform surfaces. Veneer panel 100 may then be run through a flex machine to introduce small micro cracks into the panel by flexing the panel. The micro-cracks may not be visible to the naked eye but nonetheless may improve flexibility of the panel. The 3-ply sandwich construction of veneer panel 100 may resist breaking in the flex machine.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A flexible veneer panel, comprising:
   a face veneer including a plurality of first micro cracks, wherein the face veneer comprises a thickness from 0.015 inches to 0.030 inches, wherein the face veneer forms a decorative surface of the flexible veneer panel;
   a metal mesh in direct contact with a first surface of the face veneer, the first surface being oriented away from the decorative surface, wherein the metal mesh comprises metal wires with a diameter from 0.0009 inches to 0.0019 inches, and wherein the metal mesh comprises between 325 wires-per-inch and 500 wires-per-inch;
   a backing layer having a second surface in direct contact with the metal mesh; and
   an adhesive material bonding the face veneer to the metal mesh and the backing layer.

2. The flexible veneer panel of claim 1, wherein the adhesive material comprises at least one of a phenolic glue film or a phenolic surface film.

3. The flexible veneer panel of claim 1, wherein the backing layer comprises a thickness from 0.015 inches to 0.030 inches.

4. The flexible veneer panel of claim 1, wherein the adhesive material is penetrated into the face veneer and the metal mesh.

5. The flexible veneer panel of claim 1, wherein the metal mesh comprises at least one of stainless steel or aluminum.

6. The flexible veneer panel of claim 1, wherein the metal mesh comprises a 400 wire-per-inch mesh.

7. The flexible veneer panel of claim 1, wherein the backing layer comprises a second face veneer.

8. A flexible veneer panel, comprising:
   a face veneer including a plurality of first micro cracks, wherein the face veneer forms a decorative surface of the flexible veneer panel;
   a metal mesh contacting a first surface of the face veneer, the first surface of the face veneer being oriented away from the decorative surface, wherein the metal mesh comprises between 325 wires-per-inch and 500 wires-per-inch;
   a backing layer comprising a second surface contacting the metal mesh and including a plurality of second micro cracks; and
   an adhesive material bonding the face veneer to the metal mesh and the backing layer, wherein the adhesive material is in direct contact with the first surface of the face veneer and the second surface of the backing layer.

9. The flexible veneer panel of claim 8, wherein a grain of the backing layer is aligned with a grain of the face veneer.

10. The flexible veneer panel of claim 8, wherein a grain of the backing layer is orthogonal to a grain of the face veneer.

11. The flexible veneer panel of claim 8, wherein a wood material of the face veneer is a same wood species as a wood material of the backing layer.

12. The flexible veneer panel of claim 8, wherein the metal mesh comprises at least one of stainless steel or aluminum.

13. The flexible veneer panel of claim 8, wherein the metal mesh comprises metal wires with a diameter from 0.0009 inches to 0.0019 inches.

14. The flexible veneer panel of claim 8, wherein the metal mesh comprises a 400 wire-per-inch mesh.

15. The flexible veneer panel of claim 8, wherein the face veneer comprises at least one of walnut, cherry, birch, rosewood, oak, maple, mahogany, hemlock, teak, or walnut.

16. The flexible veneer panel of claim 1, wherein the face veneer comprises at least one of walnut, cherry, birch, rosewood, oak, maple, mahogany, hemlock, teak, or walnut.

17. The flexible veneer panel of claim 1, wherein the adhesive material is in direct contact with the first surface of the face veneer and the second surface of the backing layer.

18. The flexible veneer panel of claim 17, wherein the adhesive material completely fills a volume defined by the metal mesh, the first surface of the face veneer, and the second surface of the backing layer.

19. The flexible veneer panel of claim 8, wherein the adhesive material completely fills a volume defined by the metal mesh, the first surface of the face veneer, and the second surface of the backing layer.

20. The flexible veneer panel of claim 19, wherein the metal mesh is in direct contact with the first surface of the face veneer and the second surface of the backing layer, and wherein a thickness of the face veneer extending from the first surface of the face veneer to the decorative surface is between 0.015 inches and 0.030 inches.

\* \* \* \* \*